Jan. 26, 1932.  H. G. SCHWARZ  1,842,693
METHOD OF COOKING FISH
Filed Nov. 7, 1927  2 Sheets-Sheet 2
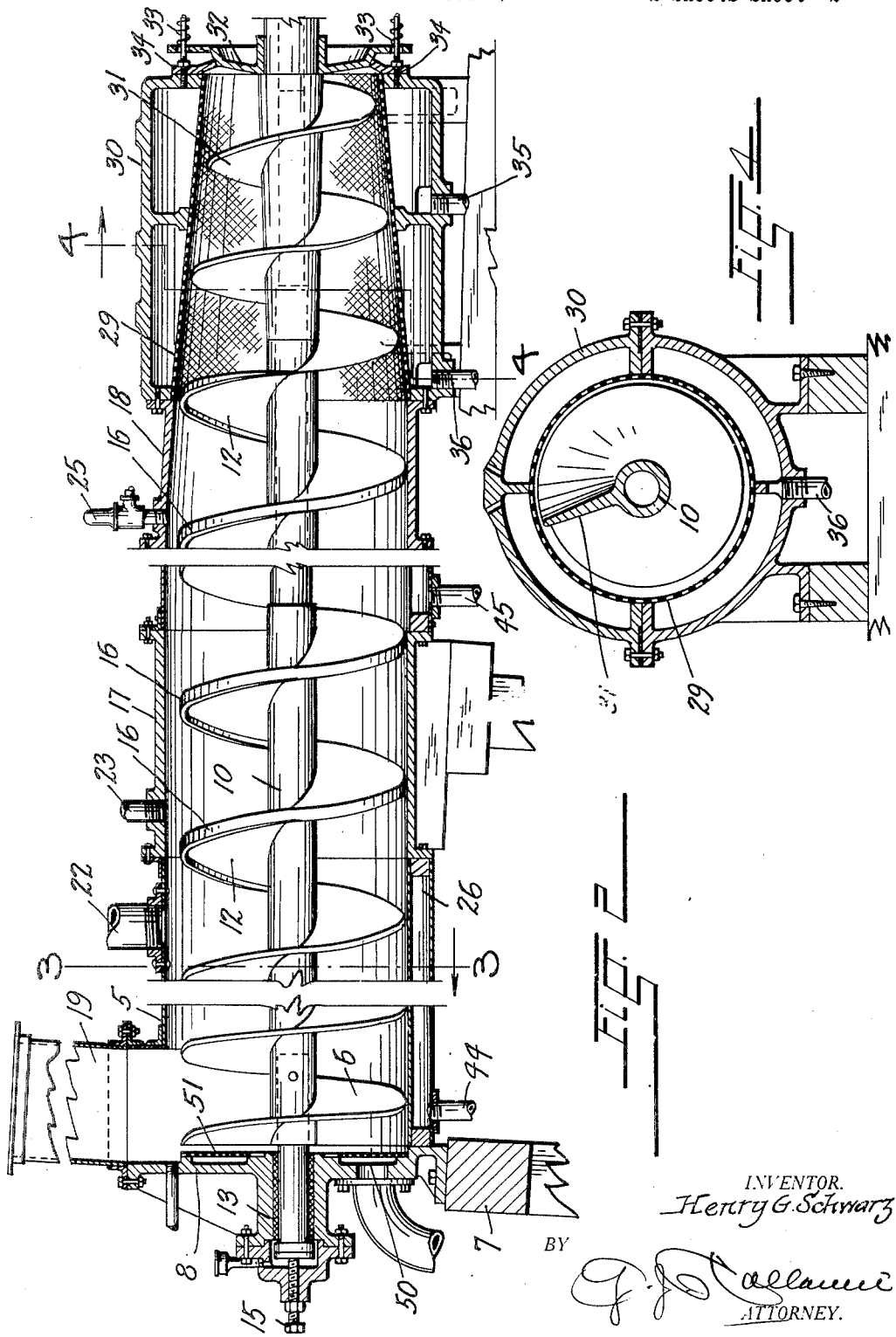

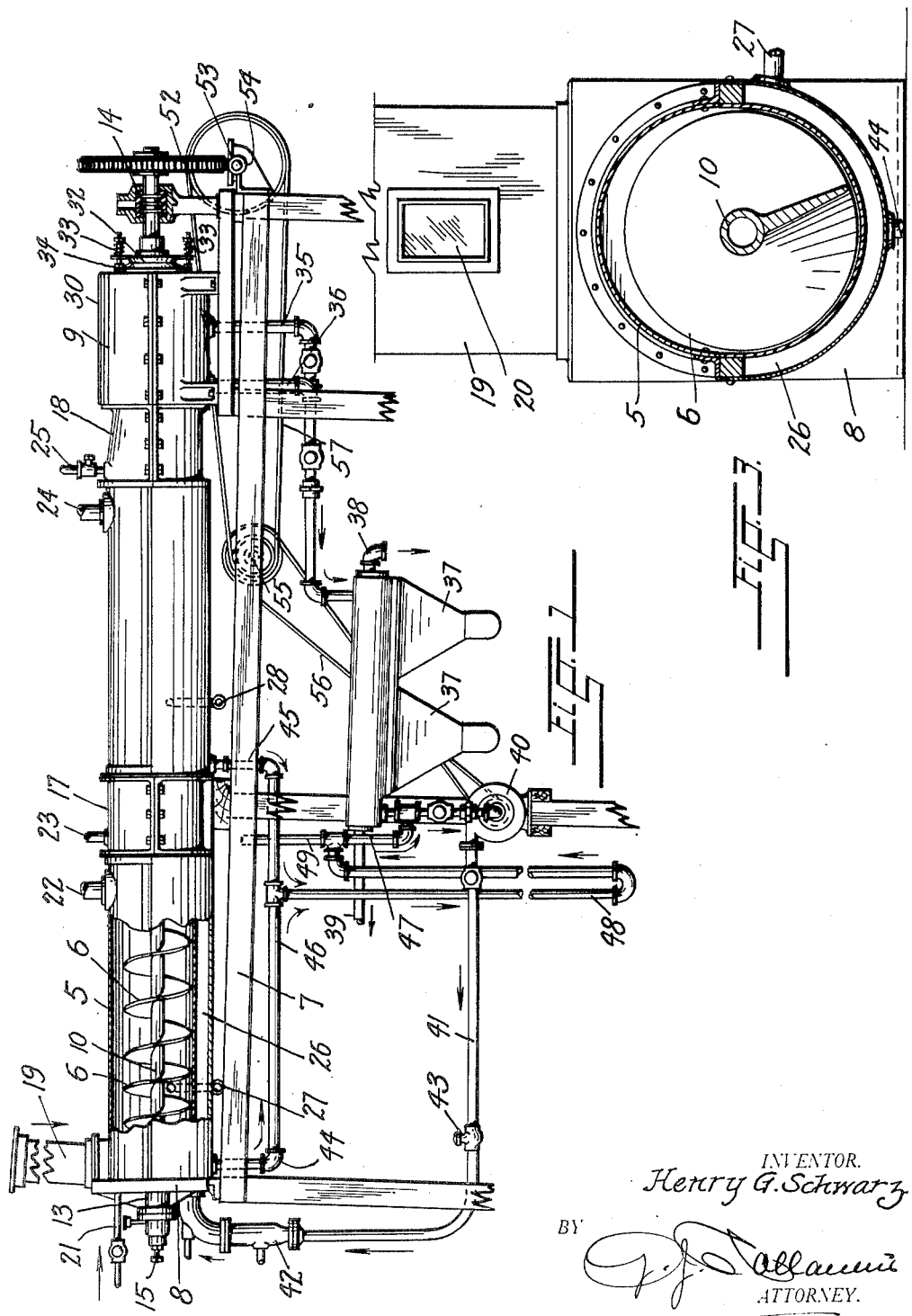

Patented Jan. 26, 1932

1,842,693

UNITED STATES PATENT OFFICE

HENRY G. SCHWARZ, OF DENVER, COLORADO

METHOD OF COOKING FISH

Application filed November 7, 1927. Serial No. 231,652.

This invention relates to a method of cooking fish and other animal matter, for the production of animal food or fertilizer and its principal objects are to provide a method of cooking the fish in the presence of hot water and to provide an apparatus for carrying the cooking method into effect in a simple, practical, economical and highly efficient manner.

It has been customary heretofore in by-product plants and fish reduction plants, to cook the fish with steam. This process is unsatisfactory mostly by reason of the difficulties of properly controlling the temperature, and of preventing the escape of steam and waste of heat. The result is that the product is frequently unevenly cooked and constitutes an emulsion of fine meat, oil and water.

Another objection to the steam process is that the entire condensation of the steam is discharged with the cooked product and must be separated in the refuse press, giving a very high amount of liquid from which the oil is often very hard to separate, especially in case of an undercooked or overcooked product and high press emulsion.

All of the above defects are eliminated by the hot water method of the present invention, which is continuous and economical and under constant control of the operator and which yields a properly cooked product without an excess of water and fine meal, from which the oil is readily separated in a subsequent treatment.

Briefly, my improved method consists in conveying the material in the presence of hot water to a distant point of discharge while being subjected to a pressure which may be gradually decreased as the material advances.

The product is subjected to a higher pressure, as a continuation of the cooking step, by which the liquid, water, oil and fine meal, is expressed from the solid matter which is separately discharged. The water, oil and meal are separated in a following treatment and the water is reheated and returned to the feed end of the apparatus in which the process is performed.

The process provides for control of the temperature during cooking, by the introduction of steam or other heating fluid to the advancing mass so that the process is adapted for the treatment of various kinds of materials requiring different temperatures to cook it to the desired degree during the period of its travel between the distanced points of feed and delivery.

In the accompanying drawings in which like reference characters designate corresponding parts throughout the views, Figure 1 represents a partially sectional side elevation of an apparatus designed for the performance of the process outlined hereinbefore, Figure 2, a fragmentary longitudinal section of the cooking element of the apparatus illustrated in Figure 1, drawn to an enlarged scale, Figure 3, a section taken on the line 3—3, Figure 2, and Figure 4, a section along the line 4—4, Figure 2.

The cooking element of the apparatus comprises a duct 5 of oval section through which in practice, the material is advanced by movement of a slowly rotating screw conveyer 6. The duct is mounted in a relatively slanting position upon a supporting structure 7 so that by proper adjustment of the structure the duct may be placed in a sloping position for the purpose of regulating the water level in the duct so that it may be completely filled at the inlet and provide for less water capacity at the outlet, thereby facilitating drainage.

The duct is preferably composed of axially alined flanged sections, it is closed at its feed end by a head 8 and it connects at its opposite end with a press 9.

The screw conveyor consists of a shaft 10 extending lengthwise through the duct and the press, and a helical blade 12 carried by the portion of the shaft inside the duct. The pitch of the blade increases from the feed end to the discharge end of the duct and the blade extends in close proximity to the bottom of the duct, leaving a wider space at the top of the same.

The shaft extends into a bearing 13 on the head 8 of the duct and through a thrust bearing 14 which is mounted on the supporting structure beyond the end of the press 9. A set screw 15 on the bearing 13 engaging the end of the shaft, regulates the pressure upon the thrust bearing.

Parts of the helical blade inside the duct are peripherally flanged as at 16, to provide a bearing surface for its support on sections 17 and 18 of the duct which are made of heavier material than the major portion of the duct. The duct is at its closed end surmounted by a feed stack 19 which may be provided with a glass-covered peep hole 20 through which the rate of feed of the material may be observed.

In the operation of the apparatus, the duct is filled with hot water of the temperature required to cook the fish or other material, the material is fed into the water-filled duct from the stack 19 and is slowly transported by the rotating conveyor toward the delivery end of the duct connecting with the press.

In order to compensate for any loss of heat of the cooking water or to raise its temperature if necessary, steam may be introduced into the feed end of the duct through a valve-controlled pipe 21. For the same purpose steam may enter the material at different points during its progress through the duct, as for example by means of pipes 22, 23 and 24.

A safety valve 25 is mounted near the discharge end of the duct to provide for the escape of steam or water in case of over-pressure.

In order to maintain the temperature of the water in the duct, the lower portion of the latter is covered by a steam jacket 26 the inlets of which have been shown at 27 and 28.

The press at the end of the duct, hereinbefore repeatedly referred to, comprises a conical screen 29 inside a cylindrical housing 30. A helical blade 31 of lesser pitch than that inside the duct, is carried by the shaft, within the tapering screen and the small end of the screen is covered by a circular plate 32 which is slidable on the shaft against the pressure of two or more springs 33.

The plate normally bears upon a rim 34 and in the operation of the press, the solids from which the liquid is expressed, press the plate outwardly and pass through the annular space between the plate and the rim. The liquid matter in the product of the cooking element passes through the screen into the surrounding space of the housing 30, and thence flows through pipes 35 and 36 to a separator 37 of suitable size and construction, which is the subject of a separate application for patent.

In the separator, the meal settles out of the liquid and accumulates at the bottom of the separator, the supernatant oil flows off the surface of the liquid through an overflow outlet 38, excess water is discharged by an overflow 39 but the greater amount of water is drawn from the separator by a centrifugal pump 40 and returned to the feed end of the cooker through a pipe 41.

Before entering the duct, the liquid passes through a heater 42 preferably of the steam injection type so that the water upon re-entering the cooker is again at the temperature required in the process. A check valve 43 in the pipe 41 prevents the return flow of the liquid. The water of condensation of the steam jacket 26 is discharged through a pipe 44 which is connected with the water discharge pipe of the separator by a conduit 47. A pipe 45 connects the interior of the duct with the separator, for the separate drainage of free liquid and especially free oil prior to pressing the material.

The conduit includes a trap 48 to overcome the pressure in the jacket, and it has a vent 49 for the escape of gases. The pipe 41 through which the water is returned to the cooking element, connects with an opening 50 in the head of the duct, and a screen 51 covering the opening, prevents the solid matter in the duct from obstructing the inflow of the liquid.

The conveyers of the cooking element and the press are in the operation of the apparatus slowly rotated by means of a worm wheel 52 at the end of the shaft protruding through the thrust bearing 14, and a worm 53 on a driving shaft 54, meshing with the worm wheel. The centrifugal pump 40 is driven from a counter shaft 55 by means of a crossed belt 56, and a belt 57 by which the movement of the drive shaft is transmitted to the counter shaft.

It will be understood from the above description that the process of cooking fish or other material in the apparatus is continuous, that the heating can be effected to any desired degree necessary to insure proper cooking and that the heat can be regulated by automatic devices to maintain an even temperature as required.

The devices may be of any suitable character, and not being a part of the present invention, have not been shown in the drawings.

The fish entering the cooker, immediately falls into a hot solution which is kept at the desired temperature by the steam jacket to avoid cooling during the cooking process. The temperature in the cooker may be raised by the admission of steam through one or more of the various inlets and the steam entering through the pipes 21 at the feed end of the duct facilitates and expedites the feed of fresh material from the stack.

The increasing pitch of the screw blade in the duct, causes the material to loosen up as it advances so that the water may pass more freely through the material as it moves toward the press where the pressure is higher. It may be advantageous to decrease the pitch of the screw in the duct at the discharge end of the latter so as to subject the material to a slight increase of pressure before it enters the press.

The liquid being continuously returned from the separator to the feed end of the press, renders the operation continuous without the attention required in other processes, it being understood that the condensation water from the steam jacket makes up for any loss of liquid in the separator.

Having thus described my improved method of cooking fish and kindred materials in the presence of hot water and having explained the construction of apparatus capable of carrying the process into effect, it is to be understood that variations in the construction and relative arrangement of the parts of the apparatus may be resorted to without departing from the spirit of the invention. The press as shown and described is well adapted to readily separate solids from the liquid at the termination of the cooking process, but a press of different type may be employed if so desired.

Having thus described my invention, what I claim and desire to secure by Letters Patent is:—

1. A process for cooking fish and kindred materials consisting in cooking the material while being conveyed under gradually decreasing pressure to a point of delivery and subjecting the cooked material in an action continuous with the conveying action, to increased pressure for the expression of its liquid contents.

2. A process for cooking fish and kindred materials consisting in conveying the material in hot water to a point of delivery, maintaining the temperature of the water by an externally applied heating fluid, expressing liquid from the cooked material, separating oil and solids from water in the liquid, reheating the separated water and spent heating fluid, and returning the same to material under treatment.

In testimony whereof I have affixed my signature.

HENRY G. SCHWARZ.